(12) United States Patent
Wu

(10) Patent No.: US 10,334,924 B2
(45) Date of Patent: Jul. 2, 2019

(54) PROTECTIVE CASING FOR ELECTRONIC PRODUCT

(71) Applicant: SHENZHEN ILLUSDESIGN CREATIVE CO., LTD., Shenzhen, Guangdong (CN)

(72) Inventor: Quanzheng Wu, Shenzhen (CN)

(73) Assignee: SHENZHEN ILLUSDESIGN CREATIVE CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/768,772

(22) PCT Filed: Apr. 21, 2017

(86) PCT No.: PCT/CN2017/081439
§ 371 (c)(1),
(2) Date: Apr. 16, 2018

(87) PCT Pub. No.: WO2018/191956
PCT Pub. Date: Oct. 25, 2018

(65) Prior Publication Data
US 2019/0059540 A1    Feb. 28, 2019

(51) Int. Cl.
*A45C 11/00* (2006.01)
*H04B 1/3888* (2015.01)
(Continued)

(52) U.S. Cl.
CPC .............. *A45C 11/00* (2013.01); *G06F 1/16* (2013.01); *H04B 1/3888* (2013.01);
(Continued)

(58) Field of Classification Search
USPC .................................... 206/320, 45.2, 45.24
See application file for complete search history.

(56) References Cited

U.S. PATENT DOCUMENTS

| 8,820,525 B1 * | 9/2014 | Zanxiang | F16M 11/10 206/320 |
| 9,641,212 B1 * | 5/2017 | Tien | A45C 11/00 |

(Continued)

FOREIGN PATENT DOCUMENTS

| CN | 206100142 U | 4/2014 |
| CN | 206100143 U | 4/2014 |

(Continued)

OTHER PUBLICATIONS

PCT International Search Report; Application No. PCT/CN2017/081439; dated Jan. 29, 2018; 8 pages.

(Continued)

*Primary Examiner* — Jacob K Ackun
(74) *Attorney, Agent, or Firm* — Conley Rose, P.C.; Grant Rodolph

(57) ABSTRACT

A protective casing for electronic product includes a flexible body and a support assembly. The support assembly includes a fixing plate, a support arm and a pivot assembly. One end of the support arm is pivotably around the pivot assembly so as to be opened/closed relative to the fixing plate. A mounting zone is provided at the flexible body, with two openings being arranged in the mounting zone. A connecting plate is provided between the two openings. One end of the fixing plate penetrates through one opening from a front side of the flexible body and is snap-fitted to the flexible body, and the other end of the fixing plate penetrates through the other opening from the front side of the flexible body and is snap-fitted to the flexible body. The connecting plate abuts against the fixing plate. Thus, the fixing plate can be firmly fixed on the flexible body.

15 Claims, 4 Drawing Sheets

(51) Int. Cl.
   G06F 1/16     (2006.01)
   H04M 1/18    (2006.01)
   H04M 1/02       (2006.01)
   H04M 1/04       (2006.01)

(52) U.S. Cl.
   CPC ....... H04M 1/185 (2013.01); *A45C 2011/002* (2013.01); *A45C 2011/003* (2013.01); *A45C 2200/15* (2013.01); *H04M 1/0216* (2013.01); *H04M 1/04* (2013.01)

(56) References Cited

U.S. PATENT DOCUMENTS

| | | | | |
|---|---|---|---|---|
| 9,788,621 | B2* | 10/2017 | Kim | ........................ B08B 3/022 |
| 2011/0284420 | A1 | 11/2011 | Sajid | |
| 2014/0262855 | A1* | 9/2014 | Gandhi | ................. A45C 11/00 206/45.24 |
| 2017/0033824 | A1 | 2/2017 | Tien | |
| 2018/0041237 | A1* | 2/2018 | Mody | ................... H04B 1/3877 |
| 2018/0213903 | A1* | 8/2018 | Tu | ........................ H04B 1/3888 |
| 2018/0248580 | A1* | 8/2018 | Edman | ................. H04B 1/3877 |
| 2018/0255891 | A1* | 9/2018 | Pelton | .................... A45C 11/00 |
| 2019/0074858 | A1* | 3/2019 | Poon | ..................... A45C 11/00 |

FOREIGN PATENT DOCUMENTS

| | | |
|---|---|---|
| CN | 303991686 S | 1/2017 |
| CN | 106388201 A | 2/2017 |

OTHER PUBLICATIONS

PCT Written Opinion of the International Searching Authority; Application No. PCT/CN2017/081439; dated Jan. 29, 2018; 4 pages.

* cited by examiner

PROTECTIVE CASING FOR ELECTRONIC PRODUCT

CROSS-REFERENCE TO RELATED APPLICATIONS

This application is a U.S. National Stage of International Patent Application No. PCT/CN2017/081439 filed on Apr. 21, 2017, by Quanzheng Wu entitled, "Protective Casing for Electronic Product", which is incorporated by reference herein as if reproduced in its entirety.

TECHNICAL FIELD

The present application relates to the technical field of electronic product accessories, and in particular, to a protective casing for electronic product.

BACKGROUND

With the continuous development of science and technology, people are increasingly dependent on electronic products, such as mobile phones, tablets, personal computers (PCs) and so forth. In order to provide the surface of the electronic products with good protection, an increasing number of users add a protective casing onto the electronic product. Meanwhile, in order to be used in conjunction with the electronic product, a support is usually provided on the protective casing such that the electronic product placed in the protective casing can be arranged in an upright using state. However, the connection between the support of the current protective casing with a support and the protective casing body thereof is not firm enough. As a result, the support is susceptible to detach from the protective casing body.

SUMMARY

In summary, an object of the present application is to provide a protective casing for electronic product, in order to solve problems, such as the unfirm connection between a protective casing and a support, said connection may even be easily detachable.

The present application provides, among others, a protective casing for electronic product, comprising a flexible body and a support assembly, the support assembly includes a fixing plate, a support arm, and pivot assembly provided between the fixing plate and the support arm, wherein one end of the support arm is pivotally jointed to the fixing plate via the pivot assembly, and the other end of the support arm is pivotable around the pivot assembly in order to be opened/closed relative to the fixing plate, a mounting zone configured for mounting the fixing plate is provided along the short side direction of the flexible body, with two openings being symmetrically arranged in the mounting zone, wherein a connecting plate is provided between the two openings, and one end of the fixing plate penetrates through one of the two openings from the front side of the flexible body and is snap-fitted to the flexible body, and the other end of the fixing plate penetrates through the other of the two openings from the front side of the flexible body and is snap-fitted to the flexible body, and the connecting plate abuts against the fixing plate.

The fixing plate is provided with a first snap-fit part, a second snap-fit part and an intermediate connection interconnecting with the first snap-fit part and the second snap-fit part. The pivot assembly is arranged at the first snap-fit part or at the second snap-fit part. The first snap-fit part penetrates through one of the openings and is snap-fitted to the flexible body, and the second snap-fit part penetrates through the other one of the openings and is snap-fitted to the flexible body, and the connecting plate abuts against the intermediate connection.

The first snap-fit part is provided with a first snap-fit component, a first groove corresponding to the first snap-fit component is provided at the flexible body, and the first snap-fit component is snap-fitted in the first groove after the first snap-fit part penetrates through the opening.

The second snap-fit part is provided with a second snap-fit component, a second groove corresponding to the second snap-fit component is provided at the flexible body, and the second snap-fit component is snap-fitted to the second groove after the second snap-fit part penetrates through the opening.

A recess is provided at the intermediate connection, wherein the recess opens towards the connecting plate, and the connecting plate is received and held in the recess.

The pivot assembly is provided at the first snap-fit part. The pivot assembly includes a damping pivot pin and a pivot plate, and the first snap-fit part is provided with two symmetrically arranged mounting pin holes, the pivot plate includes a plate body and a pivot bearing extending from one end of the plate body and curled into a pin hole, and the damping pivot pin is inserted into one of the mounting pin holes, the pivot bearing and the other one of the mounting pin holes in sequence, and the pivot bearing rotates along with the damping pivot pin around an axis between the two mounting pin holes, and the plate body is fixedly connected with an end of the support arm.

Further, the damping pivot pin includes a fixed segment and a damping pivot segment rotated around the axis relative to the fixed segment, and the pivot bearing is sleeved on the damping pivot segment and arranged stationary relative to the damping pivot segment.

Further, the fixed segment is fixed in one of the mounting pin holes and is stationary relative to said one of the mounting pin holes, and the damping pivot segment is inserted in the other one of the mounting pin holes and is rotatable around the axis relative to the said other one of the mounting pin holes.

A mounting zone is provided at the support arm, a plurality of mounting holes are provided at the plate body, and the plate body is fastened in the mounting zone via bolts penetrating each of the mounting holes.

Further, the number of the mounting holes is four, and the four mounting holes are arranged in a form of a rectangular array at the plate body.

Further, a limit slot is provided in the first snap-fit part, and the lengthwise extending direction of the limit slot is parallel to the two mounting pin holes, an insert is provided at one end of the support arm, and the insert is inserted in the limit slot upon the rotation of the support arm around the damping pivot pin.

An opening recess is provided at the other end of the support arm, the second snap-fit part is provided with two symmetrically arranged ribs along the short side direction, a curved transition groove is provided in between the two ribs, the curved transition groove is arranged opposite to the opening groove, and a gap is provided between the curved transition groove and the opening groove.

Further, the flexible body is a thermoplastic polyurethane (TPU) flexible body. The flexible body includes a base shell, and sidewalls arranged along the periphery of the base shell, and the base shell and the sidewalls together forms a cavity for accommodating the electronic product.

Further, the protective casing for electronic product further includes a back shell, the back shell is detachably arranged on the back side of the base shell, and a metal sheet is arranged between the back shell and the base shell.

Further, the protective casing for electronic product further includes a decorative panel, and the decorative panel is provided on the front side of the flexible body and covers the mounting zone.

Compared with other approaches, in the protective casing for electronic product as provided according to the present application, the support assembly comprises a fixing plate, a support arm and pivot assembly. A mounting zone configured for mounting the fixing plate is provided on the flexible body. Two openings are symmetrically provided in the mounting zone, and a connecting plate is provided between the two openings. One end of the fixing plate penetrates through one opening from the front side of the flexible body and is snap-fitted to the flexible body. Meanwhile, the other end of the fixing plate also penetrates through the other opening from the front side of the flexible body and is snap-fitted to the flexible body. At the moment, the connecting plate in the mounting zone abuts against the fixing plate. Thus, the fixing plate can be firmly fixed on the flexible body, and detachment of the fixing plate from the flexible body is avoided in the process of using.

REFERENCE NUMERALS ARE APPENDED

Figure 1:
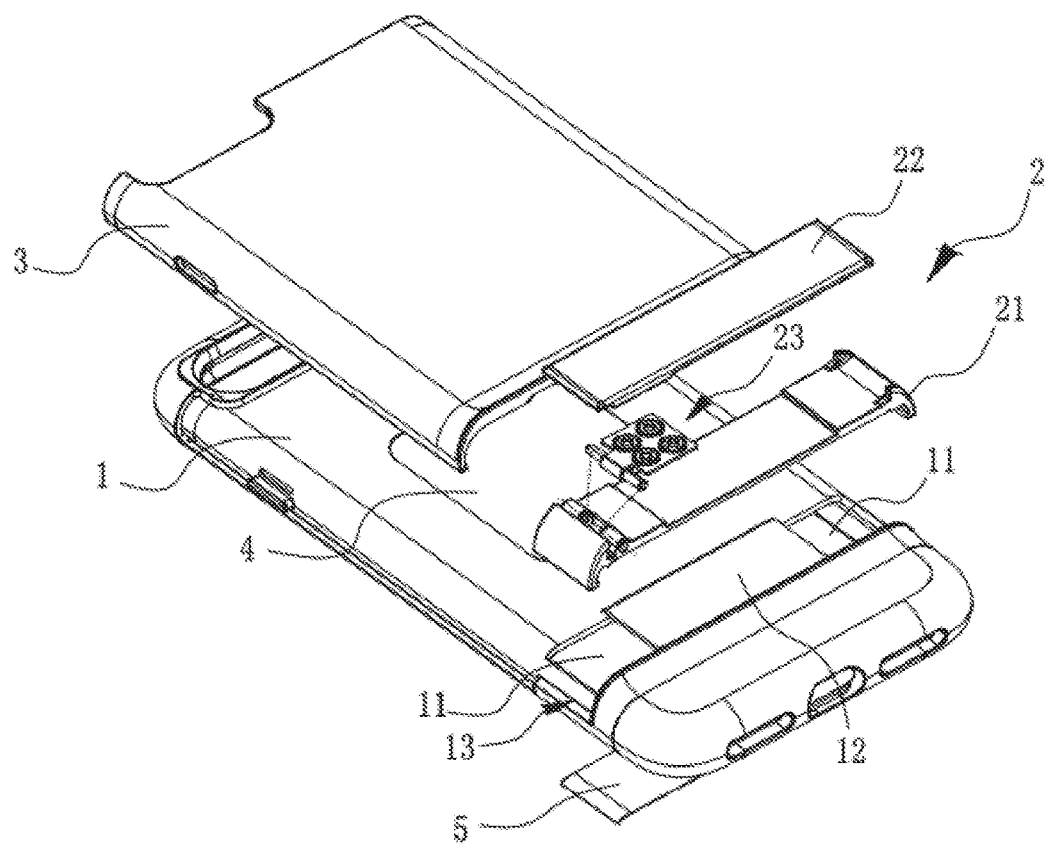
FIG. 1 is a protective casing for electronic product according to an embodiment of the present application.

Flexible body 1, Support assembly 2, Fixing plate 21, Support arm 22, pivot assembly 23, Openings 11, Connecting plate 12, First snap-fit part 211, Second snap-fit part 212, Intermediate connection 213, First snap-fit component 214, First groove 13, Second snap-fit component 215, Second groove 14, Recess 216, Damping pivot pin 231, Pivot plate 232, Mounting pin holes 2111, Plate body 2321, Pivot bearing 2322, Fixed segment 2311, Damping pivot segment 2312, Mounting zone 221, Mounting holes 2323, Limit slot 217, Insert 222, Opening recess 223, ribs 218, Curved transition groove 219, Base shell 15, Sidewalls 16, Back shell 3, Metal sheet 4, and Decorative panel 5.

DETAILED DESCRIPTION OF THE EMBODIMENTS

In order to enable objects, technical solutions, and advantages of the present application to be clearer and more understandable, the present application will be further described in detail hereinafter with reference to the drawings and embodiments. It should be understood that the specific embodiments described herein are only intended to illustrate but not to limit the present application.

It should be noted that when an element is referred to as being "fixed" or "provided/arranged" to another element, it can be provided directly or indirectly to the other element. When an element is referred to as being "connected/jointed" to another element, it can be connected directly to the other element or indirectly to the other element.

It should also be noted that orientation terms, the left, the right, the upper, the lower, the top, the base and so forth, which are only conceptual relative to each other or takes the normal using state of the product for reference, and should not be considered to be restrictive.

The implementation of the present application will be described in detail hereinafter with reference to specific embodiments. Referring to FIG. 1, a protective casing for electronic product as provided according to an embodiment of the present application comprises a flexible body 1 and a support assembly 2. The support assembly 2 includes a fixing plate 21, a support arm 22 and pivot assembly 23 provided between the fixing plate 21 and the support arm 22, wherein one end of the support arm 22 is pivotally jointed to the fixing plate 21 via the pivot assembly 23, and the other end of the support arm 22 is pivotable around the pivot assembly 23 in order to be opened/closed relative to the fixing plate 21. The flexible body 1 is flexible, and a mounting zone configured for mounting the fixing plate 21 is provided along the short side direction of the flexible body 1, with two openings 11 being symmetrically arranged in the mounting zone, wherein a connecting plate 12 is provided between the two openings 11. One end of the fixing plate 21 penetrates through one of the two openings 11 from the front side of the flexible body 1 and is snap-fitted to the flexible body 1 (Wherein, one side of the flexible body 1 configured for accommodating the electronic product is defined as the front side. On the contrary, the other side of the flexible body 1 is defined as a back side). The other end of the fixing plate 21 also penetrates through the other one of the two openings 11 from the front side of the flexible body 1 and is snap-fitted to the flexible body 1, and the connecting plate 12 abuts against the fixing plate 21.

The protective casing for electronic product as provided according to an embodiment of the present application, wherein the support assembly 2 includes a fixing plate 21, a support arm 22 and a pivot assembly 23. A mounting zone configured for mounting the fixing plate 21 is provided at the flexible body 1, with two openings 11 symmetrically arranged in the mounting zone, wherein a connecting plate 12 is provided between the two openings 11. One end of the fixing plate 21 penetrates through one of the two openings 11 from the front side of the flexible body 1 and is snap-fitted to the flexible body 1. Meanwhile, the other end of the fixing plate 21 also penetrates through the other one of the openings 11 from the front side of the flexible body 1 and is snap-fitted to the flexible body 1. At the moment, the connecting plate 12 in the mounting zone abuts against the fixing plate 21. Thus, the fixing plate 21 can be firmly fixed on the flexible body 1, and detachment of the fixing plate 21 from the flexible body 1 is avoided in the process of using.

Further, referring to FIG. 1 to FIG. 4, in the embodiment, the fixing plate 21 is provided with a first snap-fit part 211, a second snap-fit part 212 and an intermediate connection 213 interconnecting the first snap-fit part 211 and the second snap-fit part 212. The pivot assembly 23 can be arranged at the first snap-fit part 211 or at the second snap-fit part 212. The first snap-fit part 211 penetrates through one of the two openings 11 and is snap-fitted to the flexible body 1, and the second snap-fit part 212 penetrates through the other one of the openings 11 and is snap-fitted to the flexible body 1, and the connecting plate 12 abuts against the intermediate connection 213. In other words, the stress directions of the first snap-fit part 211 and the second snap-fit part 212 are the same, and the stress directions of the two snap-fit parts are opposite to the stress direction of the intermediate connection 213 in order to ensure that the whole fixing plate 21 is stably fixed on the flexible body 1.

Figure 4:
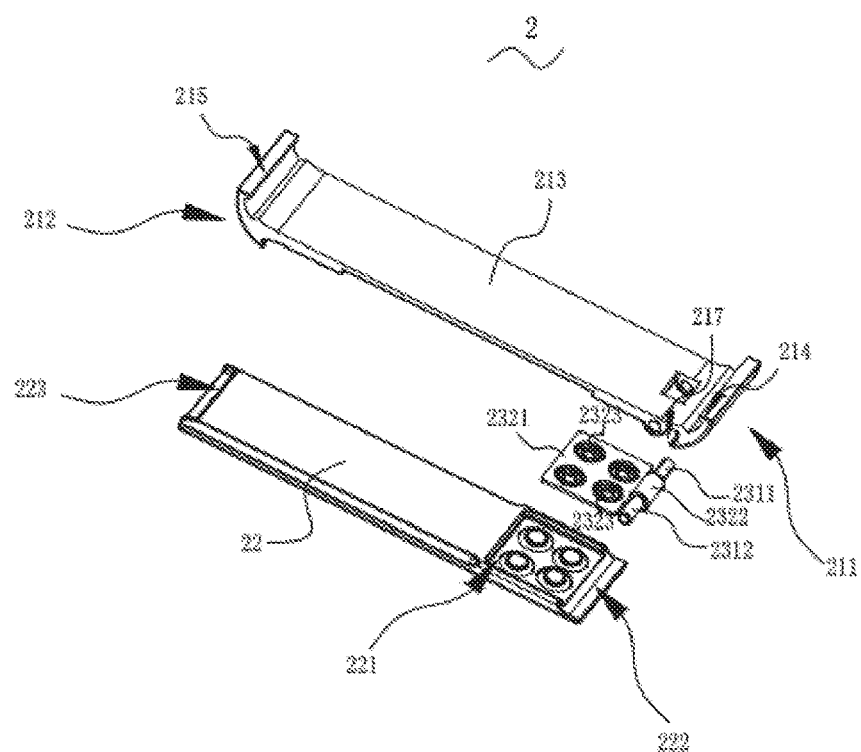
FIG. 4 is another angle of the support assembly according to an embodiment of the present application.

Further, referring to FIG. 1 and FIG. 4, in the embodiment, the first snap-fit part 211 is provided with a first snap-fit component 214. A first groove 13 corresponding to the first snap-fit component 214 is provided at the flexible body 1. The first snap-fit component 214 is snap-fitted to the first groove 13 after the first snap-fit part 211 penetrates through the opening 11. Thus, the stability of connection between the first snap-fit part 211 and the flexible body 1 is ensured.

Figure 2:
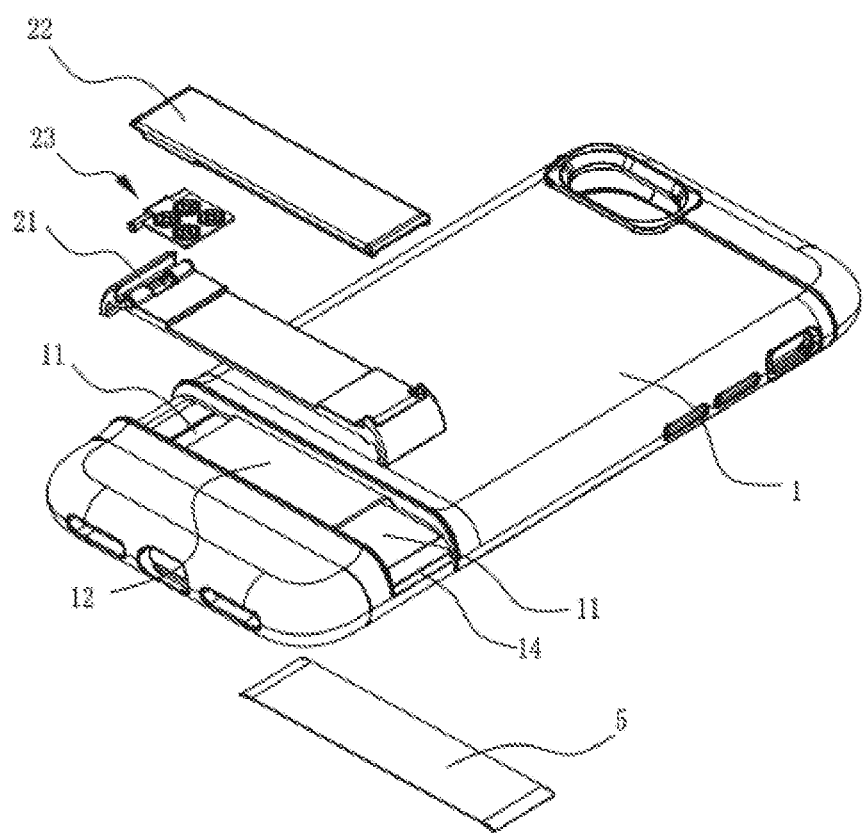
FIG. 2 is another angle of the protective casing for electronic product according to an embodiment of the present application.

Similarly, referring to FIG. 2 and FIG. 4, the second snap-fit part 212 is provided with a second snap-fit component 215. A second groove 14 corresponding to the second snap-fit component 215 is provided at the flexible body 1. The second snap-fit component 215 is snap-fitted to the second groove 14 after the second snap-fit part 212 penetrates through the opening 11. Thus, the stability of connection between the second snap-fit part 212 and the flexible body 1 is ensured.

Figure 3:
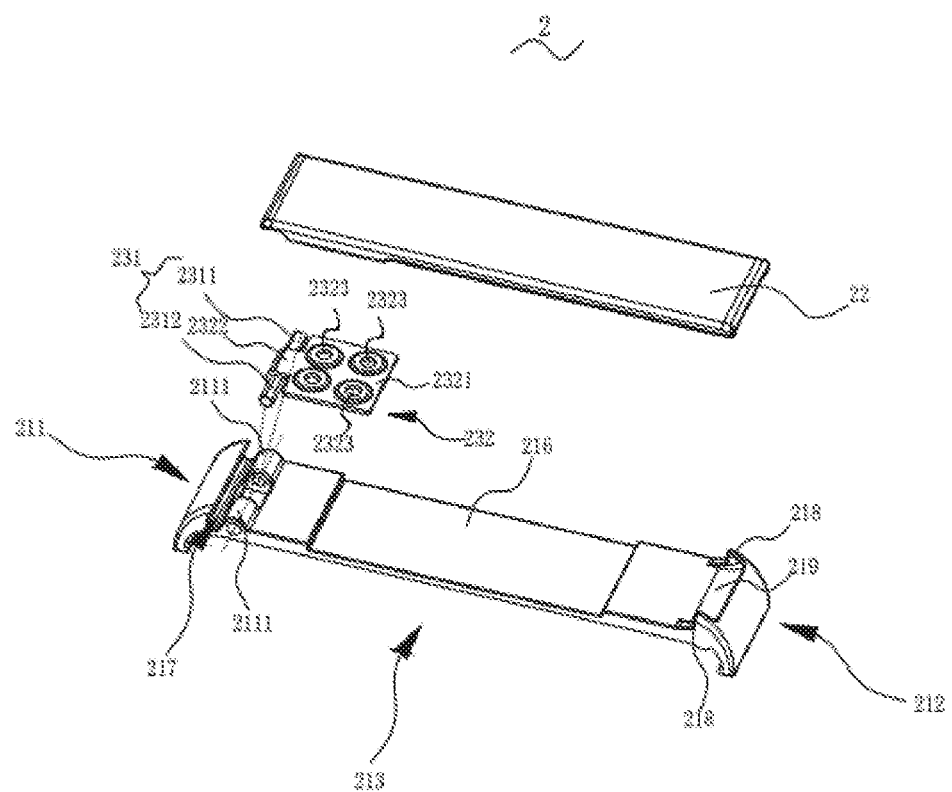
FIG. 3 is a support assembly according to an embodiment of the present application.

Further, referring to FIG. 3, in the embodiment, in order to prevent the fixing plate 21 from moving along the short side direction of the flexible body 1, a recess 216 is provided at the intermediate connection 213, wherein recess 216 opens towards the connecting plate 12, and the connecting plate 12 is received and held in the recess 216. Meanwhile, the length of the recess 216 along the short side direction of the flexible body 1 is equal to the length of the connecting plate 12. In other words, the connecting plate 12 is precisely accommodated in the recess 216. Consequently, the first snap-fit component 214 is prevented from disengaging from the first groove 13, or the second snap-fit component 215 is prevented from disengaging from the second groove 14.

Further, referring to FIG. 1 to FIG. 4, in the embodiment, the pivot assembly 23 is provided at the first snap-fit part 211. Alternatively, it can also be provided at the second snap-fit part 212 as needed. The pivot assembly 23 includes a damping pivot pin 231 and a pivot plate 232. The first snap-fit part 211 is provided with two symmetrically arranged mounting pin holes 2111, and the two mounting pin holes 2111 are arranged in parallel along the short side direction of the first snap-fit part 211. The pivot plate 232 includes a plate body 2321 and a pivot bearing 2322 extending from one end of the plate body 2321 and curled into a pin hole. The damping pivot pin 231 is inserted into one of the mounting pin holes 2111, the pivot bearing 2322 and the other mounting pin hole 2111 in sequence, and the pivot bearing 2322 rotates along with the damping pivot pin 231 around the axis between the two mounting pin holes 2111. The plate body 2321 is fixedly connected with one end of the support arm 22. Thus, the support arm 22 can stably hover relative to the fixing plate 21. Moreover, the opening angle between the support arm 22 and the fixing plate 21 can be adjusted according to actual needs. Meanwhile, the end of the support arm 22 which is far away from the first snap-fit part 211 can be used as a supporting point, or the support arm 22 can be directly used as a support. Thus, a two-direction supporting and standing of the protective casing for electronic product can be achieved.

Further, referring to FIG. 3 and FIG. 4, in the embodiment, the damping pivot pin 231 includes a fixed segment 2311 and a damping pivot segment 2312 which can rotate around the axis relative to the fixed segment 2311. The pivot bearing 2322 is sleeved on the damping pivot segment 2312 and arranged stationary relative to the damping pivot segment 2312. In other words, when the support arm 22 rotates to open/close relative to the fixing plate 21, the pivot plate 232 rotates along with the damping pivot segment 2312.

Further, referring to FIG. 3 and FIG. 4, fixed segment 2311 is fixedly jointed in one of the mounting pin holes 2111, and the cross section of the fixed segment 2311 is quadrilateral. Moreover, the cross section of the mounting pin hole 2111 is also quadrilateral such that the fixed segment 2311 can be prevented from rotating relative to the mounting pin hole 2111. Alternatively, in order to prevent the fixed segment 2311 from rotating in the mounting pin hole 2111, the cross section of the fixed segment 2311 can also be in other shapes. The Damping pivot segment 2312 is inserted in the other mounting pin hole 2111, and the Damping pivot segment 2312 can rotate in said mounting pin hole 2111.

Further, referring to FIG. 3 and FIG. 4, in the embodiment, a mounting zone 221 is provided at the support arm 22. A plurality of mounting holes 2323 are provided at the plate body 2321, and the plate body 2321 is fastened in the mounting zone 221 via bolts penetrating into each of the mounting holes 2323. Consequently, the stability of the connection between the plate body 2321 and the support arm 22 is ensured. Referring to the drawings, four mounting holes 2323 are provided at the plate body 2321, and each of the mounting holes 2323 is arranged in a form of a rectangular array at the plate body 2321. Thus, when the support arm 22 rotates relative to the fixing plate 21, the four mounting holes 2323 distributed in a form of an array are under even stress. The stability of the connection between the pivot plate 232 and the support arm 22 is guaranteed.

Further, referring to FIG. 3 and FIG. 4, in the embodiment, a limit slot 217 is provided in the first snap-fit part 211, and the lengthwise extending direction of the notch of the limit slot 217 is parallel to the two mounting pin holes 2111. An insert 222 is provided at one end of the support arm 22, and the insert 222 is inserted in the limit slot 217 upon the rotation of the support arm 22 around the damping pivot pin 231. The function of the limit slot 217 is to provide a rotating space for the rotation of the support arm 22 relative to the fixing plate 21, and meanwhile the maximum rotating angle of the support arm 22 relative to the fixing plate 21 is also limited.

Further, referring to FIG. 3 and FIG. 4, in the embodiment, an opening recess 223 is provided at the other end of the support arm 22. The second snap-fit part 212 is provided with two symmetrically arranged ribs 218 along the short side direction, and a curved transition groove 219 is provided in between the two ribs 218. The curved transition groove 219 is arranged opposite to the opening recess 223. Moreover, a gap is provided between the curved transition groove 219 and the opening recess 223. Thus, it is convenient for a user to stretch his finger into the curved transition groove 219, and apply force to the opening recess 223 such that the support arm 22 is easier to be separated from the fixing plate 21.

Figure 5:
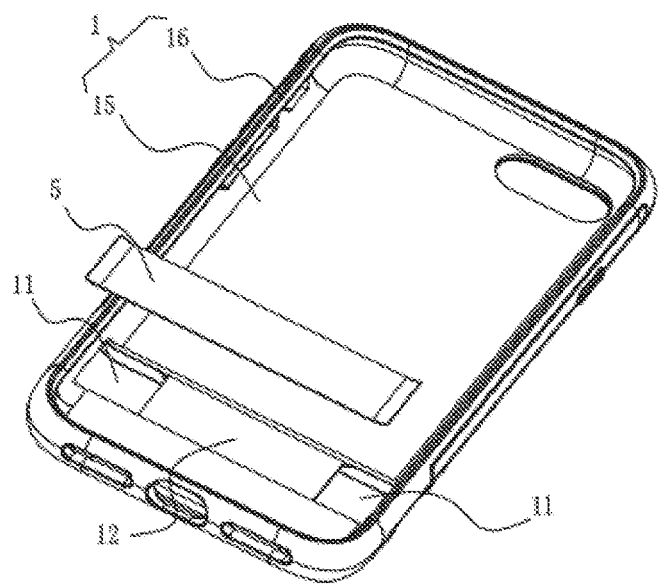
FIG. 5 is a front view of the protective casing for electronic product according to an embodiment of the present application.

Further, referring to FIG. 5, in the embodiment, the flexible body 1 is made from TPU such that the flexibility of the flexible body 1 is excellent. When the fixing plate 21 is mounted, the flexible body 1 can be deformed to match with the mounting of the fixing plate 21. The flexible body 1 includes a base shell 15 and sidewalls 16 arranged along the periphery of the base shell 15, wherein the base shell 15 and the sidewalls 16 together forms a cavity for accommodating the electronic product.

Further, referring to FIG. 1 and FIG. 5, in the embodiment, the protective casing for electronic product further includes a back shell 3, and the back shell 3 is detachably arranged on the back side of the base shell 15 in a detachable mode. Therefore, according to the using requirements of users, the back shell 3 can be replaced such that the appearance of the protective casing for electronic product is more variable. Meanwhile, a metal sheet 4 is further arranged between the back shell 3 and the base shell 15. Thus, when the support assembly 2 is not used, the protective casing for electronic product can be directly placed on a tabletop with magnetic force, and utilize the interaction force between the protective casing for electronic product and the metal sheet 4 to ensure that the protective casing for electronic product is stably fixed on the tabletop.

Further, referring to FIG. 1, FIG. 2 and FIG. 5, in the embodiment, the protective casing for electronic product further includes a decorative panel 5. The decorative panel 5 is provided on the front side of the flexible body 1 and covers the mounting zone 221. Therefore, the openings 11 of the mounting zone 221 is prevented from being exposed, and the contact with friction between the support assembly 2 and the electronic product is avoided.

The above descriptions are only preferred embodiments of the present application, and are not intended to limit the present application. Any modification, equivalent replacement, improvement and the like, which are made within the spirit and principle of the present application, are all included in the protection scope of the present application.

The invention claimed is:

1. A protective casing for electronic product, comprising:
a flexible body; and
a support assembly coupled to the flexible body and comprising:
  a fixing plate;
  a support arm;
  a pivot assembly disposed between the fixing plate and the support arm, wherein one end of the support arm is pivotally jointed to the fixing plate using the pivot assembly, and wherein another end of the support arm is pivotable around the pivot assembly in order to be opened or closed relative to the fixing plate; and
  a mounting zone disposed along a short side direction of the flexible body and configured to mount the fixing plate,
  wherein two openings are symmetrically arranged in the mounting zone,
  wherein a connecting plate is disposed between the two openings,
  wherein one end of the fixing plate penetrates through one of the two openings from a front side of the flexible body and is snap-fitted to the flexible body,
  wherein the other end of the fixing plate penetrates through the other one of the two openings from the front side of the flexible body and is snap-fitted to the flexible body, and
  wherein the connecting plate abuts against the fixing plate.

2. The protective casing of claim 1, wherein the fixing plate comprises:
a first snap-fit part;
a second snap-fit part; and
an intermediate connection coupled to the first snap-fit part and the second snap-fit part,
wherein the pivot assembly is arranged at the first snap-fit part or at the second snap-fit part,
wherein the first snap-fit part penetrates through one of the two openings and is snap-fitted to the flexible body,
wherein the second snap-fit part penetrates through the other one of the two openings and is snap-fitted to the flexible body, and
wherein the connecting plate abuts against the intermediate connection.

3. The protective casing of claim 2, wherein the first snap-fit part comprises a first snap-fit component, wherein a first groove corresponding to the first snap-fit component is provided on the flexible body, and wherein the first snap-fit component is snap-fitted in the first groove after the first snap-fit part penetrates through one of the two openings.

4. The protective casing of claim 2, wherein the second snap-fit part comprises a second snap-fit component, wherein a second groove corresponding to the second snap-fit component is provided on the flexible body, and wherein the second snap-fit component is snap-fitted to the second groove after the second snap-fit part penetrates through the other one of the two openings.

5. The protective casing of claim 2, wherein a recess opening towards the connecting plate is disposed at the intermediate connection, and wherein the connecting plate is held in the recess.

6. The protective casing of claim 2, wherein the pivot assembly is provided at the first snap-fit part and comprises a damping pivot pin and a pivot plate, wherein the first snap-fit part is provided with two symmetrically arranged mounting pin holes, wherein the pivot plate comprises a plate body and a pivot bearing extending from one end of the plate body and curled into a pin hole, wherein the damping pivot pin is inserted into one of the mounting pin holes, the pivot bearing, and the other one of the mounting pin holes in sequence, wherein the pivot bearing rotates along with the damping pivot pin around an axis between the mounting pin holes, and wherein the plate body is fixedly coupled with an end of the support arm.

7. The protective casing of claim 6, wherein the damping pivot pin comprises a fixed segment and a damping pivot segment rotated around an axis relative to the fixed segment, and wherein the pivot bearing is sleeved on the damping pivot segment and arranged stationary relative to the damping pivot segment.

8. The protective casing of claim 7, wherein the fixed segment is fixed in one of the mounting pin holes and is stationary relative to the one of the mounting pin holes, and wherein the damping pivot segment is inserted in the other one of the mounting pin holes and is rotatable around an axis relative to the other one of the mounting pin holes.

9. The protective casing of claim 6, wherein the mounting zone is provided at the support arm, wherein a plurality of mounting holes are provided at the plate body, and wherein the plate body is fastened in the mounting zone using bolts penetrating each of the mounting holes.

10. The protective casing of claim 9, wherein the mounting holes comprise four mounting holes arranged in a form of a rectangular array at the plate body.

11. The protective casing of claim 6, wherein a limit slot is provided in the first snap-fit part, wherein a lengthwise extending direction of the limit slot is parallel to the mounting pin holes, and wherein an insert is provided at the one end of the support arm and inserted in the limit slot upon rotation of the support arm around the damping pivot pin.

12. The protective casing of claim 11, wherein: an opening recess is provided at the other end of the support arm, wherein the second snap-fit part is provided with two symmetrically arranged ribs along the short side direction of the flexible body, wherein a curved transition groove is provided in between the ribs and arranged opposite to the opening recess, and wherein a gap is provided between the curved transition groove and the opening recess.

13. The protective casing of claim 1, wherein the flexible body comprises a thermoplastic polyurethane (TPU) flexible body, wherein the flexible body further comprises a base shell and sidewalls arranged along a periphery of the base shell, and wherein the base shell and the sidewalls together forms a cavity for accommodating the electronic product.

14. The protective casing of claim 13, further comprising:
a back shell, detachably arranged on a back side of the base shell; and
a metal sheet arranged between the back shell and the base shell.

15. The protective casing further of claim 1, comprising a decorative panel provided on the front side of the flexible body and configured to cover the mounting zone.

\* \* \* \* \*